UNITED STATES PATENT OFFICE.

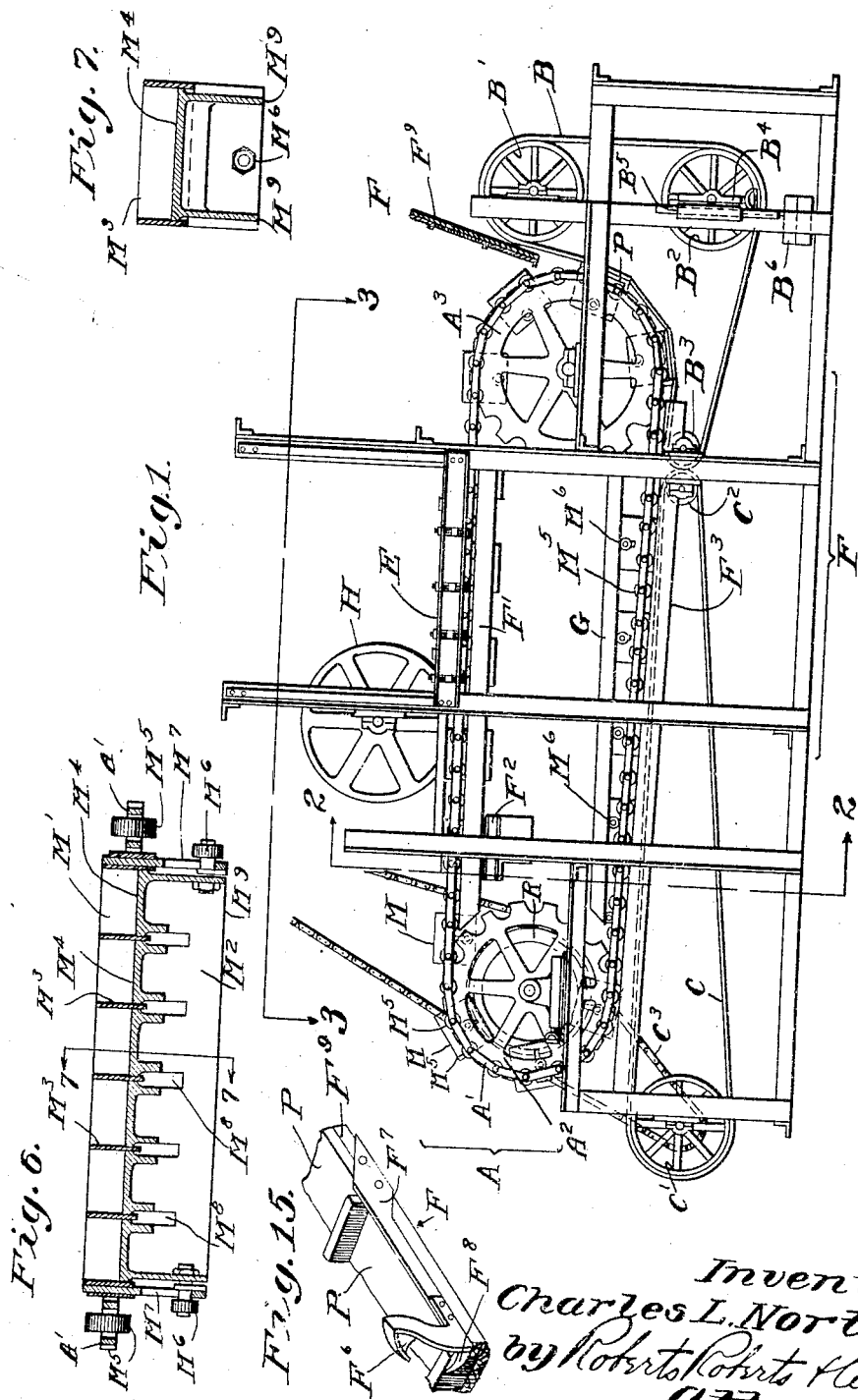

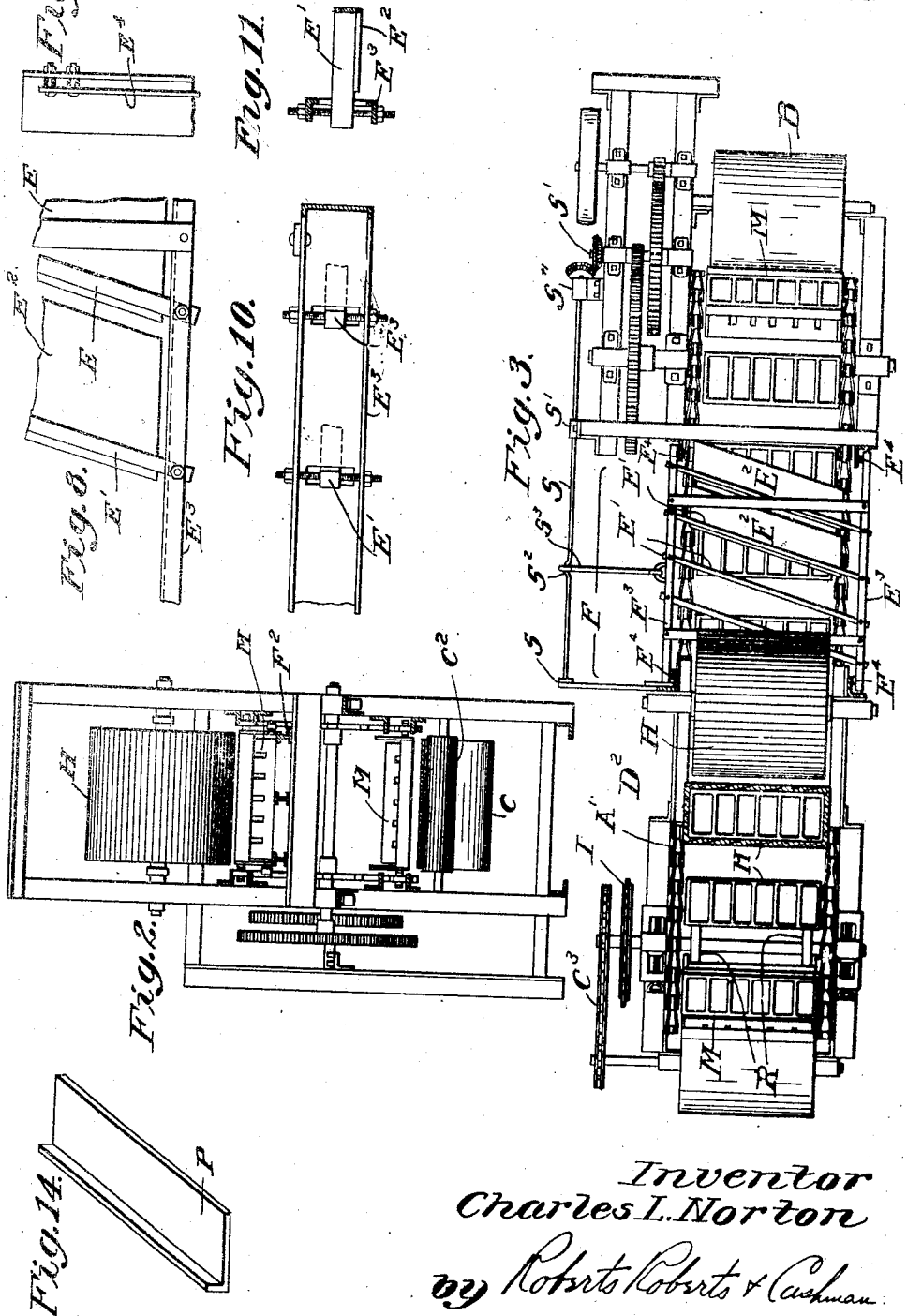

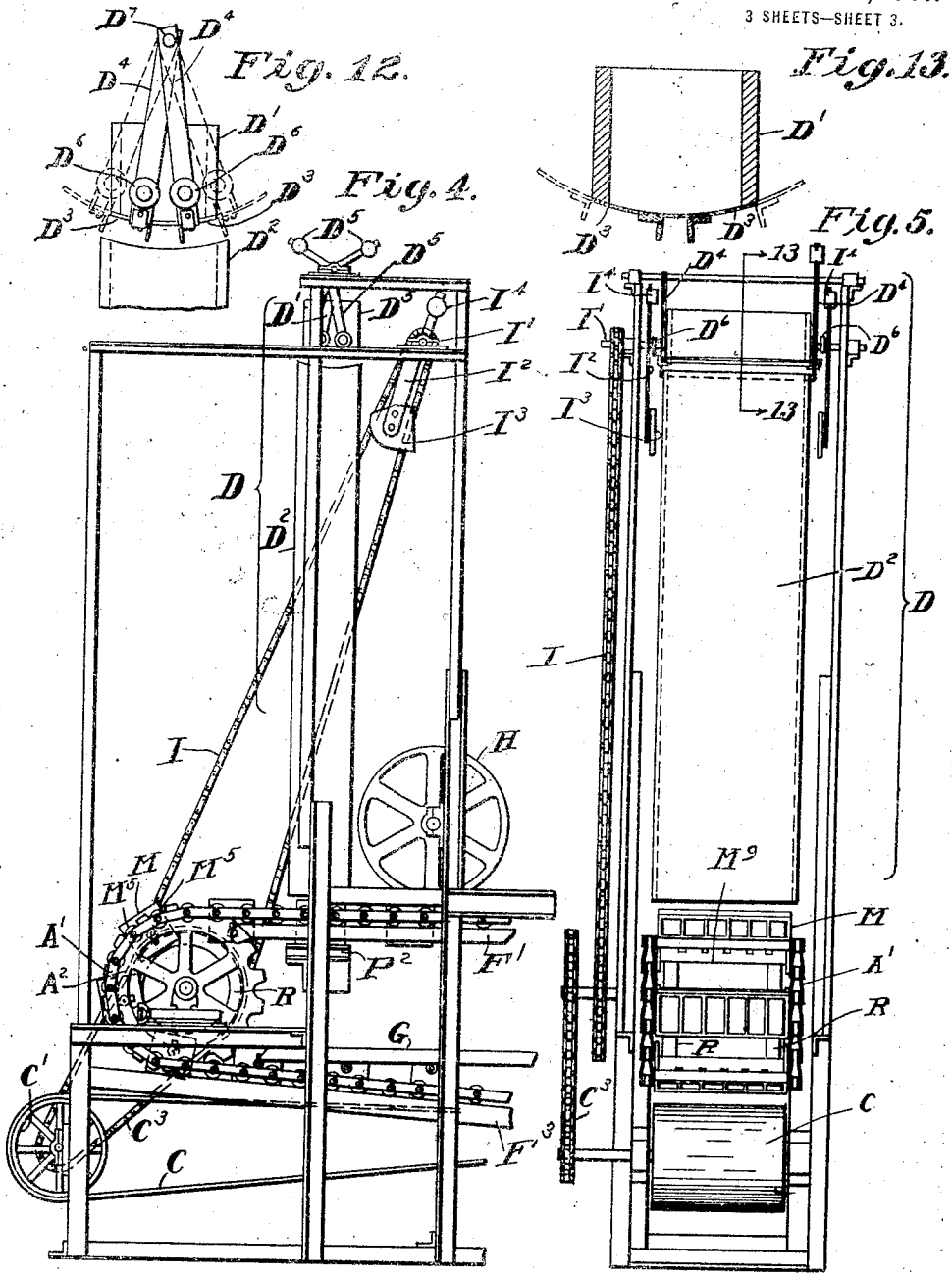

CHARLES L. NORTON, OF BOSTON, MASSACHUSETTS.

APPARATUS FOR MOLDING BODIES OF GRANULAR OR COMMINUTED MATERIAL.

1,332,677.  Specification of Letters Patent.  Patented Mar. 2, 1920.

Application filed August 29, 1918. Serial No. 251,873.

*To all whom it may concern:*

Be it known that I, CHARLES LADD NORTON, a citizen of the United States of America, and resident of Boston, in the county of Suffolk and State of Massachusetts, have invented new and useful Improvements in Apparatus for Molding Bodies of Granular or Comminuted Material, of which the following is a specification.

My invention relates to the manufacture of brick shapes and similar bodies of assembled granules or particles which, individually, are rigid, non-plastic, irregular, so that they are hardly susceptible of mutual mobility when in contact with each other, and therefore resist pressure applied with intent to cause an aggregate of such granules to fill and assume the shape of a mold. A conspicuous example of such material is the ground ganister rock of which refractory silica brick is made. This is ground to a fineness which varies from ¼ inch downward, is gritty, the granules being hardly if at all capable of slipping movement one over the other, when in close contact.

For purposes of molding into bricks, ground ganister is mixed with water and lime, the latter in about 2 per cent. proportion to the ganister. While a liberal admixture of some lubricant material might supply the degree of internal fluidity or plasticity of the mass, its incorporation therein in considerable proportion would seriously degrade the refractory character of the finished product.

My invention herein described consists of a machine for making brick-shapes and similar bodies, composed of material such as above indicated. The machine which embodies my mechanical improvements is suited and adapted to the performance of a method of making brick-shapes and the like; this method, while described herein incidentally, is the subject of claim in an application for United States Letters Patent, Serial Number 251,872, filed by me concurrently herewith.

So far as I am informed, attempts to force this silica-brick material into molds under pressure, have failed to produce the desired and indispensable filling of the corners and edges of the mold, doubtless because the granular, gritty ganister resists plastic-movement the more stubbornly with the attempt to coerce it into movement.

Heretofore, the damp coarse sand composed of ground ganister with its permissible content of water and lime, has been introduced into metal molds by hand, introduced into the corners and edges as completely and densely as the conditions of operation permitted, smoothed off with a trowel or similar implement, then removed from the molds, dried, and eventually burnt in kilns.

The limitations imposed by the material and the heretofore employed molding practice have resulted in defects, endured because unavoidable under the circumstances, in the brick product. The corners and edges of the shapes are inferior in density and frequently imperfect in form; hardly any two bricks are of the same average density throughout; in burning, the bricks shrink unevenly, and corner and edge outlines are lost, both before and after firing.

The object of my invention is to introduce such difficult material as ground ganister, into a brick-mold under such conditions of distribution, velocity and direction of movement, and quantity, that the corners and edges of the mold will be completely filled, the density of the brick-shape at corners and edges be such as to preserve shape, and preferably be superior to the density of the molded shape at its interior regions; and so that all the brick-shapes produced will possess uniform average density.

The problem presented by these conditions is, primarily, to produce such a condition of mutual mobility in the gritty particles at the instant of introduction into a mold that they will not so impede each other's movements as to prevent complete filling of the molds in the corners and edges; secondly, to succeed or supplement this momentary condition of mutual fluidity by an intimate aggregation of the particles themselves and thus produce a generally uniform density and firmness in the interior of the resulting mass.

I proffer, by my invention now to be described, a solution of this problem in both its primary and secondary aspects, and also in sundry subordinate, but practically important, other aspects, which will be elucidated in the course of description. I describe my inventions, for purposes of full illustration and example, in their application to the manufacture of silica brick, since the materials of which this product is composed present in eminent degree the obstacles which it is the object of my inventions to overcome.

In the drawings annexed to this specification which illustrate a machine embodying my invention in its structure and principles of operation,—

Figure 1 represents portions of a brick-making machine, in side elevation;

Fig. 2, the same in end elevation and part in section, viewed at its brick-shape delivering end, the section taken at the line 2—2 (Fig. 1);

Fig. 3, a plan view, partly in section on the line 3—3 (Fig. 1);

Fig. 4, the apparatus for delivering material to the brick molds, in side elevation;

Fig. 5, the material-delivering apparatus, in end elevation;

Fig. 6, a detail, showing a brick-mold in vertical longitudinal section;

Fig. 7, a detail, showing a brick-mold in section at the line 7—7 (Fig. 6);

Fig. 8, part of the troweling or leveling mechanism, in plan view;

Fig. 9, part of the same in side elevation;

Fig. 10, part of one of the side-rails of the troweling or leveling mechanism in side elevation;

Fig. 11, part of said side-rail, in vertical cross section;

Fig. 12, a detail, showing the feeding-hopper, in side elevation;

Fig. 13, a sectional view of the said feed-hopper;

Fig. 14, a perspective view of a pallet for receiving the molded brick shapes; and Fig. 15, a perspective view of the pallet feeding means.

The principal parts of the machine illustrated in the drawings are: the mold conveyer, comprehensively designated by the letter A; the pallet feeder F; the pallet holder B; the pallet support C; which may be either stationary or movable; the material feeder D; the troweling and leveling instrument E; and the mold discharger G. The moving parts are actuated by a driving mechanism so that their several and related movements are properly coördinated to produce the successive operations.

The function of the mold conveyer A is to carry a succession of brick-molds M in continuous cycle or repetition to and through the stations or regions in the machine where are preformed the following operations.

(1) Filling the mold, in all its parts and especially in its corner-portions, with a densely compacted mass of brick-material;

(2) removing surplus material from over the mold and smoothing the surface of the material; (3) covering the mold with a plate or pallet; (4) inverting the mold so that the pallet becomes a support for the molded brick shape; (5) extruding the brick shape from the mold, (or withdrawing the mold from around the shape) leaving the latter resting on the pallet.

The first operation of filling the mold takes place when the mold is passing under the material-feeder D. This part of the machine comprises means for intermittently releasing charges of brick-material at such a height above the mold that, in falling to the mold, the granular or comminuted material has an opportunity to become loosened or disintegrated before it reaches the mold which is at the time in position to receive it. Thus the material, instead of arriving at the mold in compacted condition, is in open formation, constituting a heavy shower of granules which are separated from each other, albeit slightly, by intervening air. Within limits, therefore, the granules are mobile with relation to each other. Those which strike the surfaces of the mold percussively in advance of the general multitude respond to the impact thus produced and would fly explosively in all directions, were it not for the immediately succeeding arrival of the main body of the shower, which offers a cumulative obstacle to the rebound of the earlier arrivals. The only direction in which the first-arriving granules can move without hindrance from their successors is toward the corners, edges and sides of the mold, and those granules which are in the van of attack are driven by the discrete mass that follows them, into the corner and edge recesses of the mold, while the condition of mutual separation of granules persists and confers mobility on these granules first to arrive.

Repeated experiments with a machine such as illustrated herein show that if the mass of granulated material be packed in the hopper and then suddenly released, so that it falls substantially as one piece, the results are quite unsatisfactory, the brick-molds failing to fill at the corners. Also, repeated experiments have shown that dribbling or sifting the charge of granular material, so as to protract the time of delivery of a full charge, and separate the granules relatively very widely, both in space and time of arrival at the mold, defeats the object and fails to fill the molds properly, especially at the corners.

The mutual mobility of granules progressively decreases as the mold is filled, the main body of falling granules furnishes the force and the supply of material necessary to hold in place those that have lodged in the corners and edges of the mold-cavity, and to render the entire mold-charge compact and dense. The granules which, arriving first at the mold, are projected into the corner and edge portions of the mold at high velocity, due to their own rate of fall and also to increments of velocity acquired by impact from successively arriving granules, are compacted together more densely than granules in the interior of the molded shape, which fall into place more as a mass than do those which penetrate to the corners and edges. In order to insure complete and substantially homogeneous interior density to the molded shape which is eventually to be extruded from the mold, each charge of material is preferably a quantity decidedly in excess of that required to fill the intended volume of the finished brick shape. The surplus of material over the quantity required to just fill the mold, acts by impact to tamp the contacts of the mold into final compact condition, leaving the uncompacted top portion well above the plane of the top of the mold. The surplus lies over the mold, to be removed by subsequent operations.

The succession of events in the filling of the mold, above described, takes place in a fraction of a second. The height, and therefore time of fall of each charge of material from the point of its liberation to the mold may be varied, but should be sufficient to allow the mass of granules to separate, to become comparatively discrete, before striking the mold, in order that the characteristic mutual mobility of the granules first to reach the mold may be produced. For the manufacture of nine inch straight silica bricks, a drop of twelve feet has been found in practice to give satisfactory results, the material being crushed ganister, with 2 per cent. of lime and between nine and eleven per cent. of water, approximately. In order to prevent retardation of granules, by contact with the sides of the chute through which they fall, from affecting the velocity of the granules which fall into the mold nearest its sides, the chute—as shown in the drawings,—is made somewhat larger in horizontal section than the mold. Thus only freely falling granules enter the mold.

Experience has shown that the most important part of the chute is that which is immediately over the mold. The sides of the chute at its lower end confine the mass of granules and prevent lateral dispersion of them at the instant of impact.

The side of the chute under which the mold passes after being filled should afford clearance, so that as the surplus material is scraped off by the lower edge of the chute on that side there will still remain a small surplus above the plane of the top of the mold.

Whatever may be the specific mode of producing a discrete yet closely assembled aggregate of granules, and projecting them into a mold, the result characteristic of my invention will be produced if the above described physical condition and principle of operation be present, viz., initial impact, upon and in a mold, of separated and mobile granules, followed by rapidly cumulative impact of other granules upon the earlier to arrive, and the continuation of such cumulative impact of granules until the entire mold space is filled, and compacted by surplus material acting to tamp the mold contents.

The effect of rebound of hard, non-plastic granules against similar granules which follow closely after them is to drive the first granules to arrive at the mold surfaces laterally into the corners and edges. As the mold fills, this lateral, quasi-explosive propulsion of granules, each of which is pursued by its successors, builds up a layer at the sides of the mold, which is denser than interior portions of the finally produced brick-shapes for the reason that the rebound of a particle from the immovable mold surface is more emphatic, and the return impact from successive granules more forcible, than at regions in the interior of the brick-shape.

In the operation of the machine herein described, each mold, M, in the chain receives its charge as it travels beneath the material-feeder D, and then proceeds to the troweling and leveling instrument E. The interior of the chute $D^2$ is somewhat larger in horizontal cross-section than the mold M, so only those granules of which the fall is unimpeded by contact with the sides of the chute will enter the mold. Here the surplus material is scraped off the mold, and the remaining mold-content smoothed and compacted at its upper surface. Then, by operation of the pallet feeder F and pallet holder B a flat metal plate, called a pallet, is placed and held as a cover over the full mold, and as the mold carrier A continues to move the mold along it inverts it, so that the pallet becomes the bottom of the mold, supporting the molded shape. In this condition the mold and pallet arrive at the pallet support C. As the mold and pallet progress, each on its own carrier, their respective paths of movement gradually diverge, and by means of a mold discharging device G (presently to be described more in detail) the molded shape is extruded, the mold drawn from it, until, at the delivering end of the pallet carrier the pallet, with the brick-shape resting on it emerges from the machine, to be removed by any suitable means and taken to the drying chambers. When the pallet support C is stationary it is made as smooth as possible so that the pallets may be caused to slide freely along by the advancing molds.

The molds may be single or multiple, as desired; the mold shown by way of illustration has six compartments, each adapted to form the shape of a straight rectangular brick.

The following detailed description of the several members of the brick machine will enable any person skilled in the mechanical arts to erect and operate such a machine.

Referring to Figs. 1, 2 and 3: The mold-conveying member of the machine shown in the drawing consists of sprocket wheels $A^2$ and $A^3$ and the sprocket chain $A^1$. The molds M are joined at intervals to links of the chain $A^1$, these links being provided at their joints with rolls $M^5$. These rolls after leaving the sprocket wheel $A^2$ are sustained by and travel on the rail $F^1$ which is secured to the frame of the machine.

Each mold is made in two parts as shown in Figs. 6 and 7. The box part $M^1$ is a cellular frame divided into rectangular compartments by the partitions $M^3$. The bottom part $M^2$ comprises a number of platforms $M^4$ which constitute the bottoms of the mold compartments, lying between the partitions $M^3$. The bottom part $M^2$ is mounted in sliding relation to the box part $M^1$, the sliding traverse being determined, guided and limited by the slots $M^7$ formed in the ends of the box part of the mold in which slide the roll studs $M^6$ which are secured to the bottom part of the mold. This bottom part is cut away or slotted at $M^8$ to accommodate the mold partitions $M^3$ when the bottom part is moved, as hereinafter described, to extrude shapes of molded material from between the mold partitions $M^3$.

Returning to Figs. 1 and 2; at one stage of their movement with the sprocket chain $A^1$ the molds M pass over the supporting beam at $F^2$ so that the bottom part $M^2$ of each mold at that point of its travel derives a reinforced support from the beam $F^2$. It is at this point that the material to be charged into the mold compartments strikes the mold forcibly in a manner herein described and at that point therefore the mold bottom is preferably given the rigid and adequate support of the beam $F^2$.

Those members of the machine which are representative of the mold-charging factor which is part of my invention, are not shown in Figs. 1, 2 and 3 but are illustrated in Figs. 4 and 5 and in further detail in Figs. 12 and 13. Referring to these figures; directly over the supporting beam $F^2$ the material-feeding and charging factors are arranged; these comprise a vertical, hollow, tubular chute $D^2$, a hopper $D^1$ immediately over the chute and intermittently operating hopper gates $D^3$. The material, as for instance ground ganister with a small content of lime and a proper proportion of water, is supplied to the hopper $D^1$ in any desired manner. Supplying mechanism is not shown in these drawings since any suitably designed bucket conveying apparatus would serve the purpose. It being understood that at proper intervals the hopper $D^1$ is given a supply of material, the intermittent material-feeding mechanism will operate to release a suitable measured charge of material from the hopper. The charge-releasing mechanism (see Figs. 12 and 13) consists of a pair of swinging gates $D^3$ mounted upon the swinging arms $D^4$. At or near the ends of these arms are mounted bosses $D^6$; the arms are extended above their pivot $D^7$ and carry counterweights $D^5$. A sprocket chain I, driven from the shaft which carries the sprocket chain $A^1$, turns the shaft $I^1$ upon which arms $I^2$ are mounted, each of these arms carrying a cam plate $I^3$ and a counterweight $I^4$. As the shaft $I^1$ rotates it periodically carries the cam $I^3$ between the bosses $D^6$ moving them apart and thus opening the hopper gates $D^3$ and discharging the load of material in the hopper from which it then falls freely through the chute $D^2$. The intermittent release of material from the hopper $D^1$ is so timed that when the material reaches the bottom of the chute $D^2$ there is presented to it one of the open molds M. The quantity of material intermittently discharged from the hopper $D^1$ should be in material excess of that which is needed to fill the compartments of the mold M leaving a surplus on top of the mold to be manipulated by subsequent operations of the machine. As hereinbefore explained, the physical condition of the material, the special relations of its particles are such that when the charge of material strikes the mold its particles fill all of the corner and edge parts of the mold compartments in a condition of high density, and its general interior mass is compactly and uniformly distributed through the mold spaces. It is at this point in the operation of the machine that the supporting beam $F^2$ provides the desirable rigid support for the mold and relieves other parts of the mechanism from the full duty of sustaining the impact of the charge of material.

Each mold after being thus charged travels onward in the machine, the lower edge of the chute scraping off much of the excess material and the material remaining in excess on the top of the mold is first subjected to a supplemental smoothing and compacting pressure by the idle roll H. Thence each mold passes under the scraping and troweling apparatus, generally designated as E in Figs. 1, 2 and 3, and shown more in detail in Figs. 8, 9, 10 and 11. This scraping and troweling mechanism consists of a frame of which the principal members are the side rails $E^3$. These side rails are pendulously suspended from the frame of the machine by means of thin metal straps $E^4$ of which there is one on each corner of the frame. This flexible mode of suspension provides for a vibratory movement of the frame back and forth across the machine. This vibratory movement need have no special time relation with the other parts of the machine. It might indeed be vibrated by hand, but preferably of course, any of the obvious mechanical expedients for imparting such vibratory motion from the driving mechanism of the machine should be adopted.

The means for vibrating the frame E chosen for the purpose of illustration comprises a shaft S journaled on the frame at $s$, $s'$ and $s''$ and connected to one of the power shafts through bevel gears $S'$, the shaft S being offset at $S^2$ to form a crank which is connected with the frame E by a connecting link $S^3$. The shaft S is so positioned that the link $S^3$ is in alinement with the path of reciprocation of the frame E and the shaft is geared to the source of power so as to vibrate the frame fairly rapidly.

The scraping and troweling members mounted on the frame E consist of bars $E^1$ adjustably secured at their ends to the side rails $E^3$ and preferably extending across the machine at an angle. The shapes of the operating surfaces of these bars may vary; they should be of such character as best to remove and smooth down progressively the material in the molds M so as finally to leave the molds filled level to the top. I find that smoothing and troweling plates, such as $E^2$, secured to the last of these leveling and smoothing bars to operate on the material provide a desirable finishing effect. Such flexible plates are indicated at $E^2$, Figs. 3, 8 and 11.

From the troweling and finishing plates E, the molds M are carried by the chains $A^1$ to and over the sprocket wheels $A^3$ and in passing around this sprocket wheel the molds are inverted. In order to keep the molded material from spilling at this stage in their travel the molds are covered with pallets P. These pallets, one of which is shown in detail in Fig. 14, consists of plates with an upturned edge along one side. This upturned edge engages with the edge of the mold M which in its return travel from the wheel $A^3$ to the wheel $A^2$ is the leading edge. Adjacent to the sprocket wheel $A^3$ there is mounted the pallet holding belt B which runs over the drums $B^1$, $B^2$ and $B^3$. The belt B is yieldingly tensioned by slidably mounting the journal bearing $B^4$ of the pulley $B^2$ in a vertical guideway $B^5$ and suspending adjustable weight $B^6$ on the journal bearing $B^4$. The pallets, which may be introduced by hand and placed upon the molds M as these travel in succession on the sprocket wheel $A^3$, are nipped between the belt B (which is kept under tension) and the molds M, and thus held in place to prevent the material in the molds from spilling out or from leaving the molds until the proper time arrives for extrusion of the molded shapes from the molds themselves.

For the purpose of illustration I have shown an automatic pallet-feeding device F in Figs. 1 and 15, this device comprising an inclined slideway $F^0$ extending into the space between the mold carrier and the belt B and a dog $F^8$ adapted to engage the upturned edge of the lowermost pallet and serve as a stop. The dog $F^3$ is mounted on a spring $F^7$ so as to swing laterally and disengage the lowermost pallet. A cam $F^6$ is provided on the dog so as to be engaged by the molds M to free a pallet for each mold as it passes.

As the chain $A^1$ carries the molds thus inverted toward the sprocket wheel $A^2$ the pallets P are drawn from the pallet holding belt B across the gap between the drums $B^3$ and $C^2$ so that the carrying belt C thereafter supports the pallets. This carrier belt C which is mounted on the drums $C^1$ and $C^2$ is driven by means of a sprocket chain $C^3$ at the same speed as the sprocket chain $A^1$. The rolls $M^5$ now rest and travel upon the inclined rail $F^2$ so that the box part $M^1$ of each mold in its travel from the drum $C^2$ to the sprocket wheel $A^2$ is moved away from the carrier belt C a distance about equal to the depth of the material-filled compartments of the mold. Above the sprocket chain $A^1$ and on each side thereof a rail G is secured to the frame of the machine, this rail being parallel with the pallet-supporting part of the carrying belt C. The roll-studs $M^6$ which are secured to the bottom part of each mold M engage the lower edges of these rails G and as the rails $F^0$ and rails G are mounted at an angle one with the other the paths of movement of the roll-studs $M^5$ and roll-studs $M^6$ converge, and thus the bottom parts $M^2$ of the molds M are moved with relation to the box parts $M^1$ so as progressively and gently to extrude the molded shapes from the molds themselves, finally freeing them and leaving them resting on the pallets P to be carried out of the machine upon the carrying-belt C. As the pallets, each with its load of molded shapes, emerge they are removed to be taken to the drying-house where the molded shapes go through their preliminary drying treatment.

As the molds travel upwardly around the axis of sprocket wheels $A^2$ the bottom parts $M^2$ which have been telescoped into the box parts $M^1$ tend to drop into the position shown in Fig. 6 with the rolls $M^6$ at the bottom of slots $M^7$. If this tendency to drop were not counteracted the mold bottoms $M^2$ might drop at one end faster than at the other end and become wedged in an intermediate position. In order to avoid any such trouble I preferably provide two rollers R and R' on the shaft carrying sprocket wheels A², the rollers being adapted to engage the inner edges M³ of the bottom parts M² of the molds and hold the parts M² telescoped within the box parts M¹ until the molds pass the vertical plane of the axis of the rolls at which time the parts M² move longitudinally from the rollers and are gradually lowered to the position shown in Fig. 6, the two rollers R and R' supporting the parts M² at opposite ends as the parts are lowered thereby insuring uniform movement of the opposite ends of parts M² and preventing wedging.

I claim:

1. In a machine for molding brick, the combination of a series of brick-molds, a carrier therefor, means intermittently to project unconfined masses of brick-material into the molds in succession, and means to extrude the molded brick-shapes from the molds.

2. In a machine for molding brick, the combination of a series of brick-molds, a carrier therefor, means intermittently to drop masses of brick-material into the molds in succession, and means to extrude the molded brick-shapes from the molds.

3. In a machine for molding brick, the combination of a mold, means for projecting an unconfined mass of brick-material into the mold, means to cover the open top of the mold, means to invert the mold, and means to extrude the molded shape from the mold while resting on the mold-covering means.

4. In a machine for molding brick, the combination of a mold, means for dropping a mass of brick-material into the mold, means to cover the open top of the mold, means to invert the mold, and means to extrude the molded shape from the mold while resting on the mold-covering means.

5. In a machine for molding brick, the combination of a series of brick-molds, a carrier therefor, means intermittently to project unconfined masses of brick-material into the molds in succession, means to cover the open tops of the molds, means to invert the molds, and means to extrude the molded shapes from the molds while resting on the mold-covering means.

6. In a machine for molding brick, the combination of a series of brick-molds, a carrier therefor, means intermittently to drop masses of brick-material into the molds in succession, means to cover the open tops of the molds, means to invert the molds, and means to extrude the molded shapes from the molds while resting on the mold-covering means.

7. In a machine for molding brick, the combination of a series of brick-molds, a carrier therefor, means intermittently to project unconfined masses of brick-material into the molds in succession, means to remove surplus material from the tops of the molds, means to cover the open tops of the molds, means to invert the molds, and means to extrude the molded shapes from the molds while resting on the mold-covering means.

8. In a machine for molding brick, the combination of a series of brick molds, a carrier therefor, means intermittently to drop masses of brick-material into the molds in succession, means to remove surplus material from the tops of the molds, means to cover the open tops of the molds, means to invert the molds, and means to extrude the molded shapes from the molds while resting on the mold-covering means.

9. In a machine for molding brick, the combination of a mold, means for projecting an unconfined mass of brick-material into the mold, and means for exerting compacting pressure on the material in the mold.

10. In a machine for molding brick, the combination of a mold, means for dropping a mass of brick-material into the mold, and means for exerting compacting pressure on the material in the mold.

11. In a machine for molding brick, the combination of a brick-mold, and a chute through which to drop material into the mold, said chute being larger than the mold in internal horizontal cross-section.

12. In a machine for molding brick, the combination of a brick-mold, and a chute through which to drop material into the mold, with its lower end close over the mold, said chute being at its lower end larger than the mold in internal horizontal cross-section.

Signed by me at Boston, Massachusetts, this ninth day of August, 1918.

CHARLES L. NORTON.